United States Patent
Patel

(10) Patent No.: US 12,484,849 B1
(45) Date of Patent: Dec. 2, 2025

(54) FOOT HEALTH TRACKING AND INJURY PREVENTION SYSTEM

(71) Applicant: Bhaumik Tusharbhai Patel, Los Angeles, CA (US)

(72) Inventor: Bhaumik Tusharbhai Patel, Los Angeles, CA (US)

(*) Notice: Subject to any disclaimer, the term of this patent is extended or adjusted under 35 U.S.C. 154(b) by 50 days.

(21) Appl. No.: 17/187,876

(22) Filed: Feb. 28, 2021

Related U.S. Application Data

(60) Provisional application No. 62/983,564, filed on Feb. 28, 2020.

(51) Int. Cl.
*A61B 5/00* (2006.01)

(52) U.S. Cl.
CPC .......... *A61B 5/6807* (2013.01); *A61B 5/0004* (2013.01); *A61B 5/0022* (2013.01); *A61B 5/4872* (2013.01); *A61B 2562/0247* (2013.01)

(58) Field of Classification Search
None
See application file for complete search history.

(56) References Cited

U.S. PATENT DOCUMENTS

| | | | | |
|---|---|---|---|---|
| 2008/0287832 | A1* | 11/2008 | Collins | A61B 5/1038 600/587 |
| 2008/0306410 | A1* | 12/2008 | Kalpaxis | A61B 5/0002 600/592 |
| 2009/0105605 | A1* | 4/2009 | Abreu | A61B 5/0075 600/549 |
| 2009/0137933 | A1* | 5/2009 | Lieberman | A61B 5/1117 600/595 |
| 2010/0004566 | A1* | 1/2010 | Son | A43B 3/34 36/43 |
| 2010/0041959 | A1* | 2/2010 | Iwata | A61B 5/1038 601/1 |
| 2011/0054359 | A1* | 3/2011 | Sazonov | A61B 5/1118 600/595 |
| 2012/0035509 | A1* | 2/2012 | Wilson | A61B 5/1038 600/592 |
| 2013/0213145 | A1* | 8/2013 | Owings | G01L 1/225 73/862.046 |
| 2016/0324478 | A1* | 11/2016 | Goldstein | A61B 5/6803 |
| 2018/0228401 | A1* | 8/2018 | Schwartz | B29D 35/122 |
| 2019/0175100 | A1* | 6/2019 | Etleb | G01L 1/205 |
| 2019/0228570 | A1* | 7/2019 | Tran | G06Q 30/0643 |

OTHER PUBLICATIONS

Qian, Xiaoye, et al., "The Smart Insole: A Pilot Study of Fall Detection," 2019, Bodynets 2019, LNICST 297, pp. 37-49 (Year: 2019).*

* cited by examiner

*Primary Examiner* — Aurelie H Tu
(74) *Attorney, Agent, or Firm* — Michael D. Eisenberg

(57) ABSTRACT

A system for measuring foot heath, comprising a plurality of sensors embedded within a flexible sheet, an insole envelope surrounding the flexible sheet and a circuit printed on the flexible sheet. The circuit is connected to an in-built wireless controller, wherein the in-built wireless controller telecommunicatively connects to an external program. A plurality of controller boards are connected to the circuit and the plurality of sensors comprises a first set of sensors, a second set of sensors, a third set of sensors, and a fourth set of sensors.

3 Claims, 4 Drawing Sheets

FOOT HEALTH TRACKING AND INJURY PREVENTION SYSTEM

BACKGROUND OF THE INVENTION

One quarter of our body's bones are in our feet. Each normal foot has 33 joints, 26 bones, 19 muscles, and 107 ligaments. (Some people have 28 bones in each foot) If the entire foot touches the floor when you stand, you have flat feet. Young children usually have them, because their foot bones, tendons, and ligaments haven't yet formed arches. It is normal for some people to never develop arches, but flat feet can cause pain. One of the reasons for having their flat feet is due to in appropriate weight distribution of the body on these muscles while growing. Also, a full-grown adult can come across injuries and pain due to imbalance weight distribution because of poor running/walking style. Older people have problems with feet due to weakness of those bones, tendons and ligaments leads to imbalance and falls.

On the other hand, well-aligned flat feet can be helpful, because they support the body's weight over a bigger area. Fully 75 percent of people have foot problems. For example, 60 percent of foot injuries in people 18 and over are sprains and strains. Humans use approximately 300 muscles just keep themselves balanced. Most of the people either have not trained their muscles or underdeveloped this process while growing or at full grown or post grown stage. To solve this problem, the present invention provides a 3D printed insole (customized to the user's foot) with sensor assembly to track health measures and foot health to prevent foot, back and knee injuries.

DETAILED DESCRIPTION OF THE EMBODIMENTS OF THE INVENTION

Figure 1:
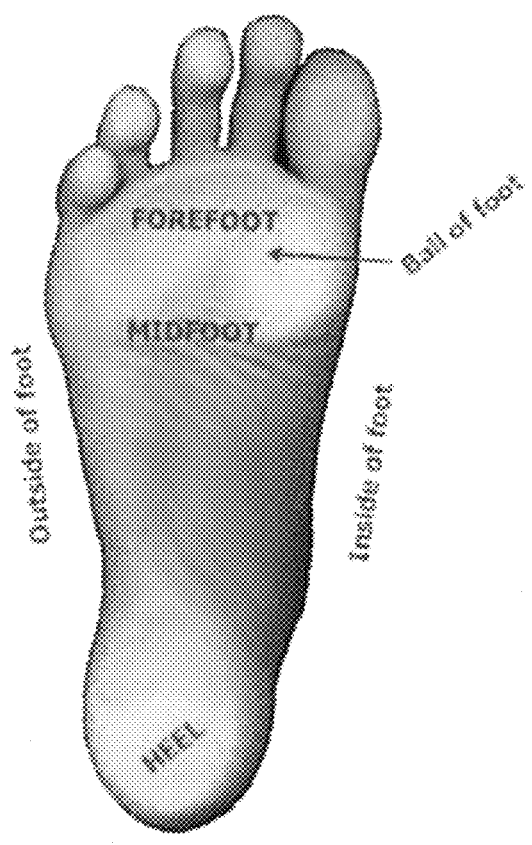
FIG. 1 is a diagram of a human foot.
Figure 2:
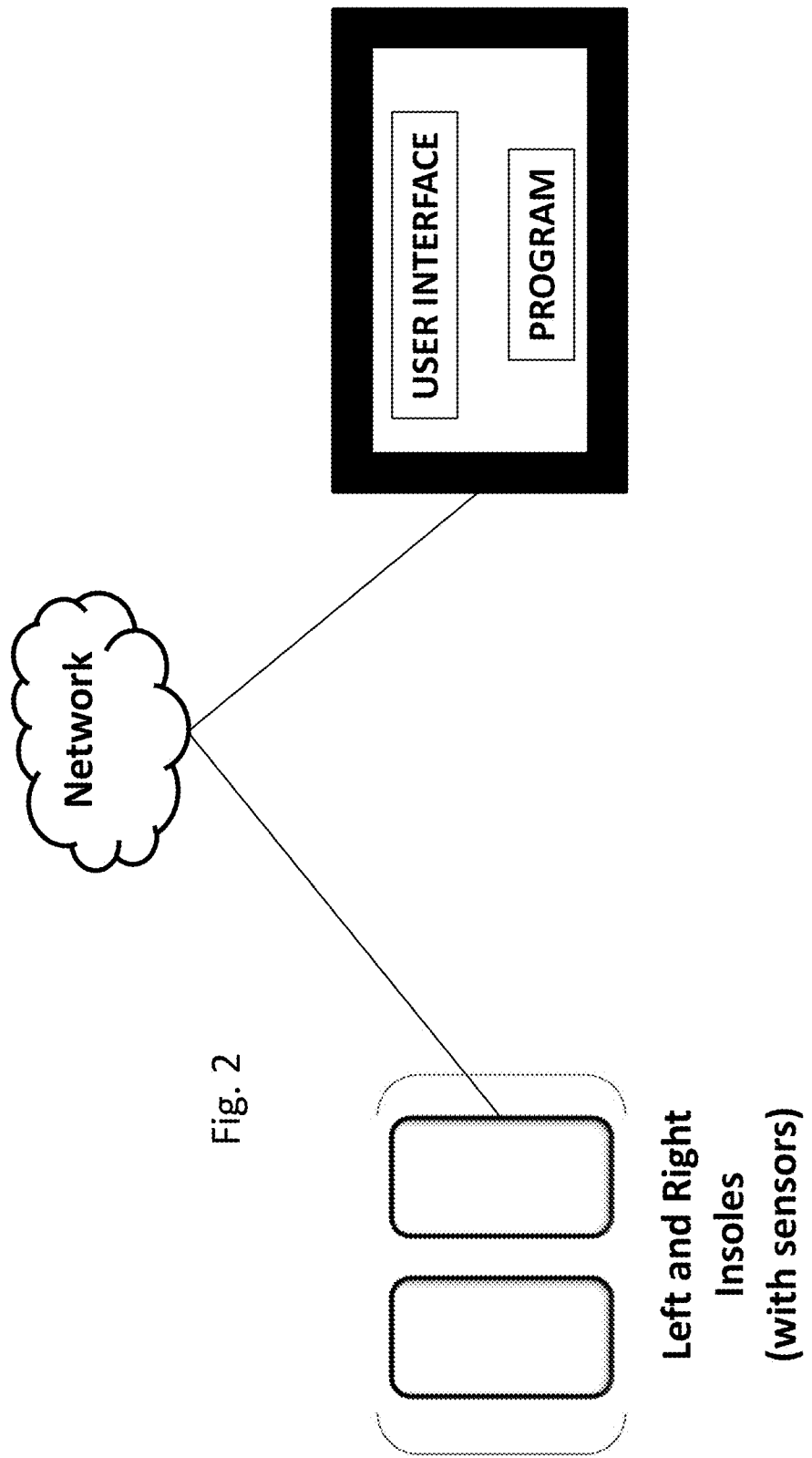
FIG. 2 is a block diagram of a foot health tracking and injury prevention system.
Figure 3:
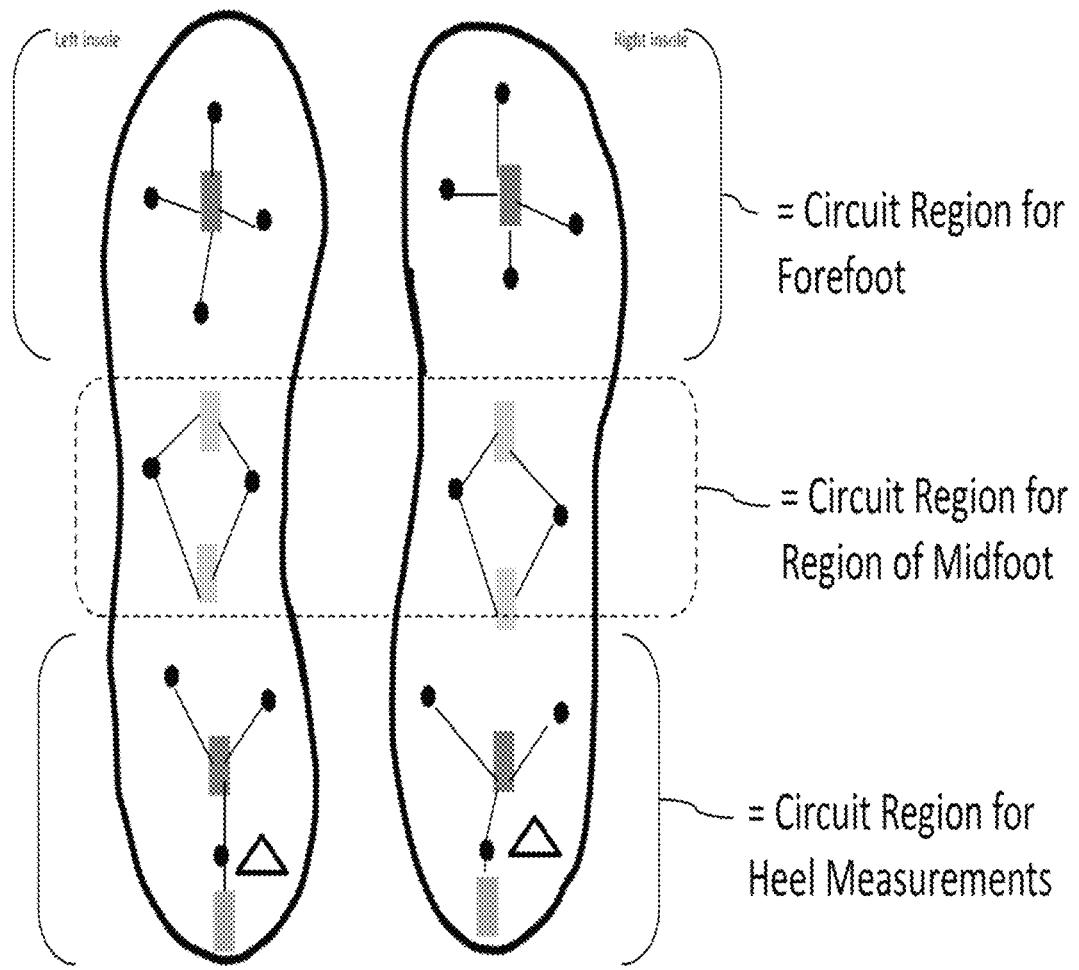
FIG. 3 is a block diagram of insoles for the foot health tracking and injury prevention system.

The present invention is directed toward a system and method for foot health tracking and injury prevention. In a variant, referring to FIGS. 2 and 3, the system has at least one insole that comprises 9 or more weight and pressure sensors covering forefoot, mid foot and heel area of the insole to cover an entire foot standing on the insole. Referring to FIGS. 1 and 2, the insole is divided into circuit regions so granular measurement can be made. The circuit regions comprise forefoot, midfoot and heel regions. Each region comprises at least a weight sensor and a pressure sensor. A step counter may be provided in a region. A temperature sensor may be provided in a region. Sensors in all the regions communicate with the wireless controller which communicates with a smart device.

The insole comprises weight sensors and fat measurement sensors to detect and track body weight, total % body fat, Visceral Fat, BMI, Body water %, Muscle mass, Bone mass, BMR and Metabolic age in real time.

The insole comprises a step counter to calculate total step count or standing hours. The insole has body heat sensors to activate all sensors and resume power to the circuit containing all sensors.

Figure 4:
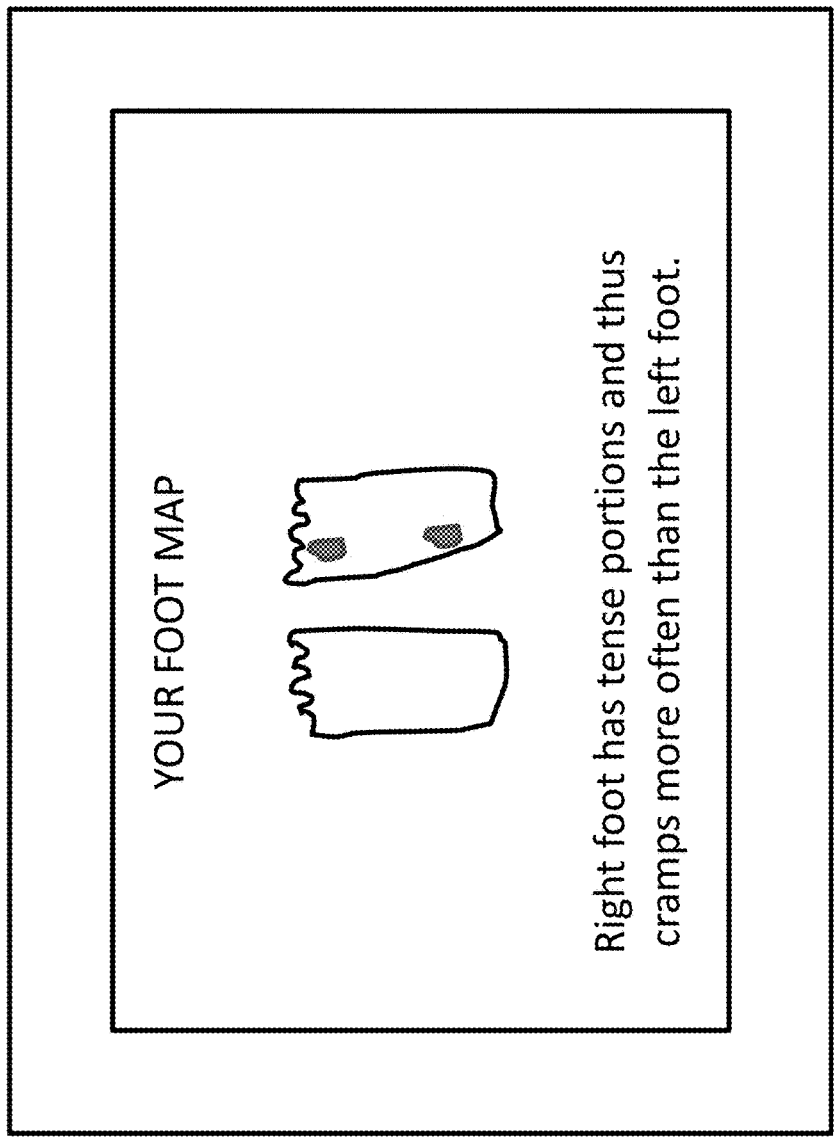
FIG. 4 is an embodiment of a user interface for the foot health tracking and injury prevention system.

The pressure sensors measure shear force (parallel force) and the weight sensors measure force perpendicular to the insole surface. The insole is configured to collect real time data for pressure and weight. The system is configured to identify areas of excess pressure and foot muscles affected by in appropriate walking, running, and standing style. Based on a user's foot weight/pressure map, referring to FIG. 4, a customized 3D printed insole is generated to remove excessive pressure and redistribute load to avoid injury. The 3D printed insole has a complete sensor assembly to collect real time data of health. This data is accessible using a mobile or computer application.

In a variant, referring to FIG. 2, the system comprises flexible conductive tape or a sheet printed with circuit having sensors embedded on the sheet. Micro controller boards are powered by a charging AC/DC adapter. Temperature sensors are provided to power on/off the circuit in the respective presence and absence of body heat. A Bluetooth controller is configured to communicate data with a smart device using a programmed application.

When the system is operational, the system collects weight and pressure data through the insole, and calculates a percentage load based on weight and pressure on the fore foot, middle foot and heel area. The system provides a complete pressure map, and a calculated knee joint pressure percentage and back joint pressure. The system is configured to send an alert when injury occurs in real time.

The system generally comprises:
1) 3D printed insole based on data collected.
2) Sensor assembly covering entire foot-embedded in insole.
3) Software application designed to analyze data and generate alerts to the user.

3D printed insole materials comprise Thermoplastic Polyurethane (TPU) and/or Thermoplastic Elastomer (TPE), or a combination of both at ratios of: 50/50, 40/60, 30/70, 20/80, 10/90, 90/10, 80/20, 70/30, or 60/40.

What is claimed is:

1. A system for measuring foot health, comprising:
   a plurality of sensors embedded within a flexible sheet;
   an insole envelope surrounding the flexible sheet;
   a circuit printed on the flexible sheet;
   the circuit connected to an in-built wireless controller, wherein the in-built wireless controller telecommunicatively connects to an external device;
   a plurality of controller boards connected to the circuit; and
   wherein the plurality of sensors comprises a first set of sensors and a second set of sensors, wherein the first set of sensors and the second set of sensors are distributed within at least a first circuit region, a second circuit region, and a third circuit region;
   wherein at least one sensor of the first set of sensors is a weight sensor configured to measure force perpendicular to the flexible sheet;
   wherein at least one sensor of the second set of sensors is a pressure sensor configured to measure a shear force parallel to the flexible sheet;
   wherein the insole envelope comports to a shape of a foot, wherein a bottom of the foot is configured to interact with the plurality of sensors;
   wherein the system comprises the external device, which is configured to collect the first set of data and the second set of data in real time during walking, running, and standing stances, and create a weight/pressure map based on the first set of data and the second set of data;

wherein, based on the weight/pressure map, the external device is configured to detect an injury occurring in real time and to generate an alert when the injury occurs.

2. A system for measuring foot health, comprising:

a plurality of sensors embedded within a flexible sheet;

an insole envelope surrounding the flexible sheet;

a circuit printed on the flexible sheet;

the circuit connected to an in-built wireless controller, wherein the in-built wireless controller telecommunicatively connects to an external device;

a plurality of controller boards connected to the circuit; and wherein the plurality of sensors comprises a first set of sensors and a second set of sensors, wherein the first set of sensors and the second set of sensors are distributed within at least a first circuit region, a second circuit region, and a third circuit region;

wherein at least one sensor of the first set of sensors is a weight sensor configured to measure force perpendicular to the flexible sheet;

wherein at least one sensor of the second set of sensors is a pressure sensor configured to measure a shear force parallel to the flexible sheet;

wherein the insole envelope comports to a shape of a foot, wherein a bottom of the foot is configured to interact with the plurality of sensors;

wherein the system comprises the external device, which is configured to collect the first set of data and the second set of data in real time during walking, running, and standing stances, and create a weight/pressure map based on the first set of data and the second set of data;

wherein, based on the weight/pressure map, the external device is configured to calculate knee joint pressure percentage and back joint pressure.

3. The system of claim 2, wherein, based on the knee joint pressure percentage and the back joint pressure, the external device is configured to detect an injury occurring in real time and to generate an alert when the injury occurs.

* * * * *